A. DI LORENZO.
AUTOMOBILE FENDER.
APPLICATION FILED DEC. 8, 1919.
1,333,797.
Patented Mar. 16, 1920.
3 SHEETS—SHEET 1.
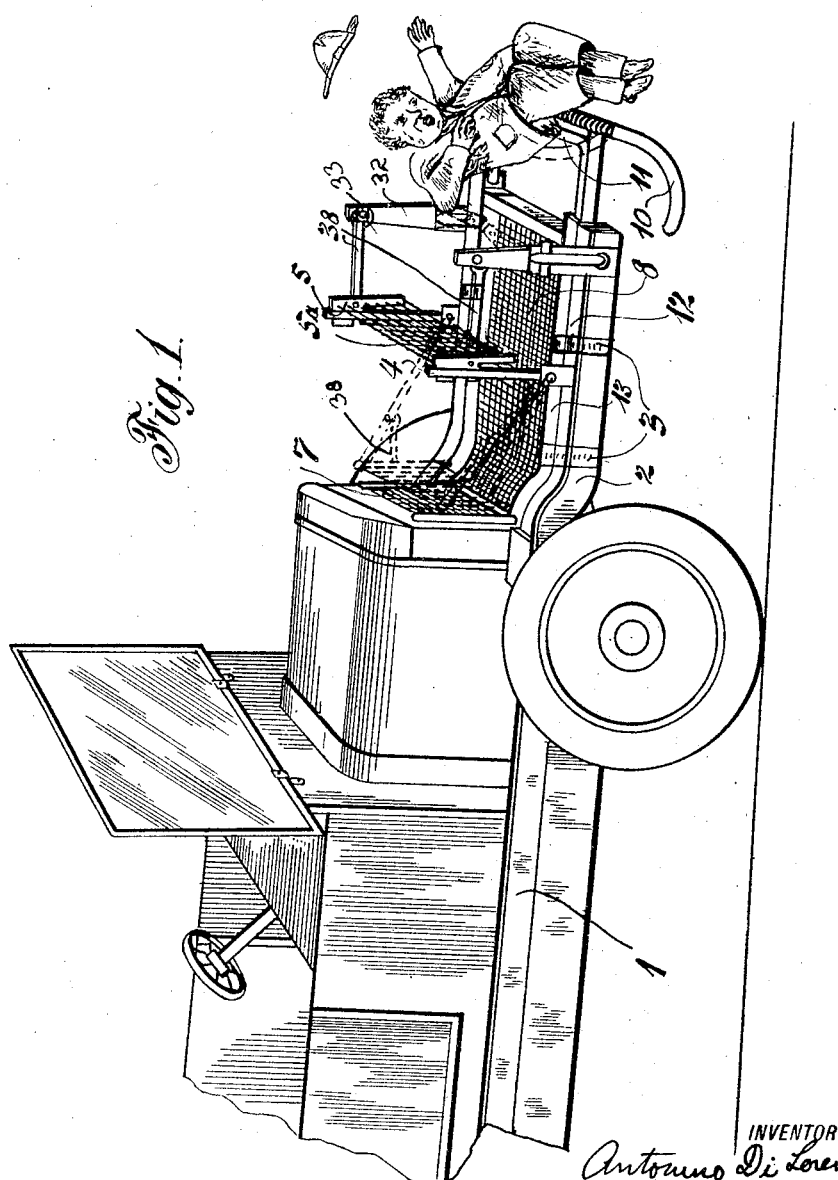
INVENTOR
Antonino Di Lorenzo
BY
Frank Ledermain
ATTORNEY

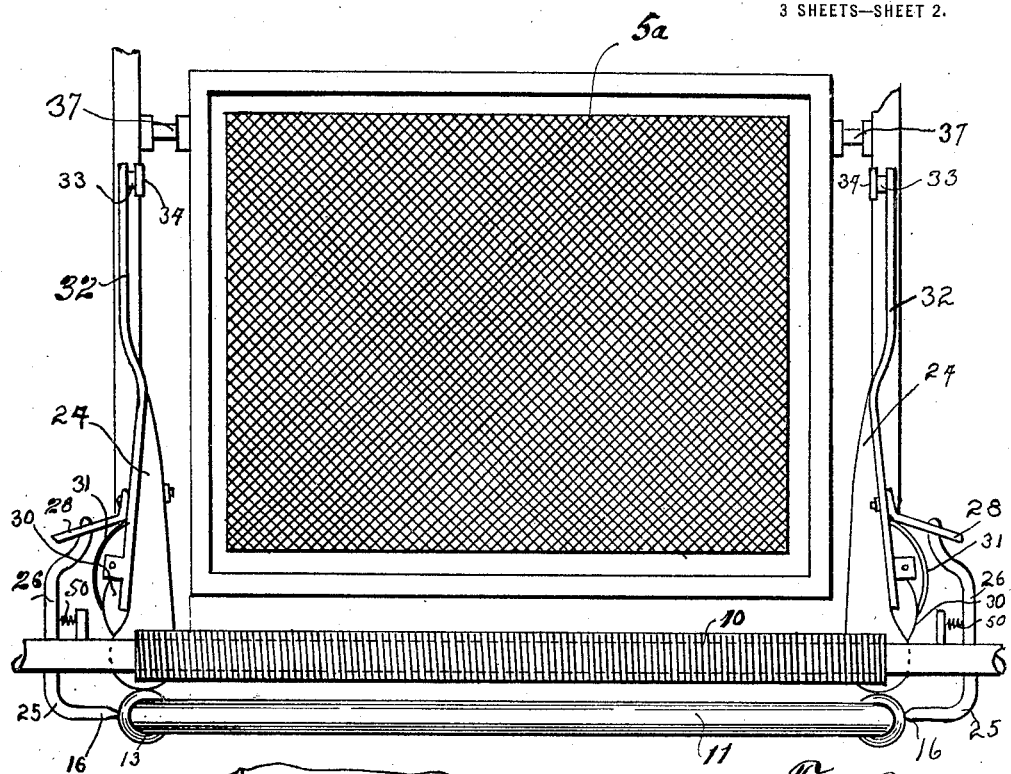

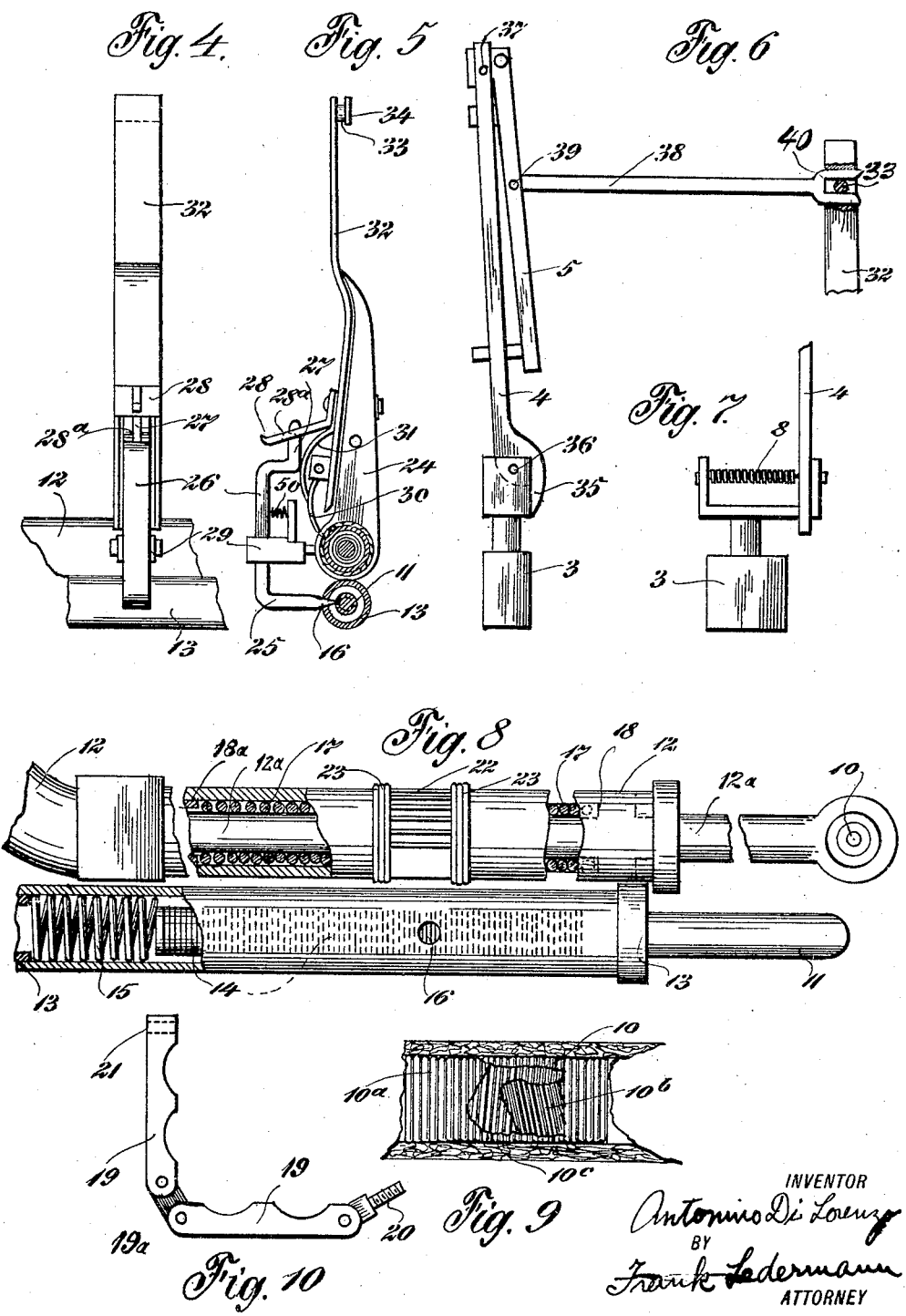

UNITED STATES PATENT OFFICE.

ANTONINO DI LORENZO, OF NEW YORK, N. Y.

AUTOMOBILE-FENDER.

1,333,797.  Specification of Letters Patent.  Patented Mar. 16, 1920.

Application filed December 8, 1919. Serial No. 343,168.

*To all whom it may concern:*

Be it known that I, ANTONINO DI LORENZO, a citizen of the United States, and resident of New York, in the county of New York and State of New York, have invented certain new and useful Improvements in Automobile-Fenders, of which the following is a specification.

This invention relates to protective devices known as fenders for automobiles, to prevent injury to one accidentally struck by an automobile, and has for its main object the provision of a novel and practical fender adapted to be mounted upon the front of an automobile and having means to absorb the shock of a collision with a person and at the same time to provide a rest for said person and to prevent his subsequent falling therefrom.

The above and other objects will become apparent in the description below, in which characters of reference refer to like-named parts in the drawings, in which, briefly, Figure 1 represents a perspective view of my device attached to the front of an automobile;

Fig. 2 is a front view of my device;

Fig. 3 is a plan view of the same;

Fig. 4 is a side view of one of the retaining members of the device;

Fig. 5 is a front view of the same;

Fig. 6 is a side view of one of the swinging members of the device;

Fig. 7 is a partial front view of the same;

Fig. 8 is a side view, partially in section, of the extension supports of the device.

Fig. 9 is a partial longitudinal section through the bumper 10; and

Fig. 10 is a detail view of an adjusting clamp used upon the device.

Referring now in detail to the drawings, the numeral 1 represents an automobile having an extended chassis or frame 2. By means of clamps 3, or in any other convenient manner, a pair of hollow members 12 and 13 are secured upon said frame, the member 12 having a spring bumper 10 at its front, and the member 13 having a rigid bumper 11 at its front end, the former being situated slightly ahead of the latter. Extensions $3^a$ are fixed to the upper member 12, and pivotally mounted therein are posts 4, on hinges 36 which are surrounded by coiled springs 8 which tend to normally force said posts forward. A hooked beak or nose 35 is provided at the bottom of each of said posts, and so fixed that the same contacts with the member $3^a$ when the said post is in vertical position, whereby said post is prevented from being forced by the tension of said spring, beyond the vertical position. Pivots 37 are provided at the top of the posts 4 in which are mounted bars 5 in suspended fashion, and between said bars is strung a screen or netting $5^a$. A similar screen 7 is fixedly attached to the rear of said frame in front of the radiator of the automobile. At 39, on the bars 5, are attached horizontal rods 38 having forked ends 40.

At a distance forward of said members $3^a$ are mounted members 24 upon the hollow member 12, one on each side of the vehicle; these members are rotatably mounted upon said member 12 as a bearing, coiled springs being adjacent thereto and adapted to force said members inward, that is, to cause the said members to rotate toward each other, and they are of such length that their ends touch after they have so rotated and the members together form a peak. Ratchet teeth 22 are provided on the surface of the member 12 at the place where said members are mounted, and a pawl 30 is attached to each of said members. Since these members are similar in all respects, the description of one only is described. A spring 31 is attached to said member 24 in order to retain said pawl in constant contact with said ratchet teeth. A support 29 is horizontally attached to the member 12, said support having a forked front in the legs of which is pivotally mounted a member 26 having its ends curved as shown. The lower end of the member 29 is pointed and a hole 16 is provided through the side of the member 13 through which said pointed end passes. An inclined member 28 is attached to the member 24 as shown, and is provided with a slot $28^a$ through which the upper end 27 of the member 26 passes. A compression spring 50 is fixed between a bracket on the member 29 and the member 26, and normally holds the latter outward. The slot $28^a$ is of such length that, when the spring 50 holds the upper portion of the member 26 to the left, the end 27 contacts with the left end of said slot, so that said end 27 prevents the member 24 from being forced to rotate inwardly by the coiled spring 23; also, so that when said end 27 is forced inward (in a manner to be presently described) the end 27 will not prevent the free rotation of the member 24 because the slot 28ᵃ will clear said end in such rotation.

Referring to the lower hollow member 13, a bar 14 passes through the same and has its surface serrated, or toothed, as shown, and an interior collar is provided at 13ᵃ, against which rests a coiled spring, the forward part of which is in contact with the end of the rod 14, and which tends to keep said rod forward. Thus the pointed end 25 of the member 26 engages said teeth when said end passes through the hole 16.

Referring to the hollow member 12, the same has a bar 12ᵃ passing therethrough, said bar having collars 18 and 18ᵃ, and between these two collars a coiled spring 17 is supported, tending normally to hold the said bar 12ᵃ outward, the purpose of this last-named spring being to absorb shock of collision only.

The bumper member 10 is composed of three coiled springs, one within the other, as shown at 10ᵃ, 10ᵇ, and 10ᶜ, and an outside flexible covering 10ᵉ surrounds the same. The clamp shown in Fig. 10, being an enlargement of the clamp 3, consists of two legs 19 pivotally joined by a bridge member 19ᵃ, and having a number of registering semi-circular recesses on the interior thereof. A screw 20 is pivotally mounted in one end of one leg, and a receiving hole 21 is provided in the other, so that the same may be locked by screwing said screw in said hole.

An extension 32 is attached to the member 24 and has at its top a small drum 33 and a shank 34. As seen in Fig. 6, said drum receives the forked end 40 of the rod 38, and thus the shank 34 prevents the member 32 from rotating inward, by virtue of the spring 23, while said forked end is engaged by said drum and shank.

Now, supposing that a person is struck by the vehicle, then the coiled-spring bumper 10 will be bent inward, reducing the shock to the person, and at the same time the upper bumper 11 will be forced backward by the shock. (Previous to the collision the parts are all set as shown in full lines in Fig. 1.) The backward motion of the latter will force the pointed end 25 out of engagement from the teeth on the bar 14, in cam-like fashion, causing the upper end 27 of the member 26 to swing inward, thereby allowing the slot 28ᵃ to clear the said upper end and permitting the member 32 to swing inward by virtue of the spring 23. However, this does not occur at this time, as the forks 40, in engagement with the drums 33, prevent the inward motion of the members 32. At the next instant, however, the person is thrown against the screen 5ᵃ, whence the rods 38 are carried back and the forks 40 release the members 32, allowing the latter to fall inward so as to clasp about the body of the person so as to prevent his falling out of the fender; and the ratchet and pawl arrangement of said members prevents his lifting said members, even by force. It should have been before mentioned that the floor of the device comprises a screen or net 8 suspended between the members 13. The screen 5ᵃ is then carried back by the force of the person striking it, until it assumes its position against the screen 7, whereby it adds a protection from the hot radiator. Thus the person is carried on the fender, in no danger from injury or from falling therefrom.

Having thus described my invention, what I claim and desire to secure by Letters Patent is as follows:

1. A device of the class described comprising a frame adapted to be mounted on the chassis of a vehicle, a net suspended between the sides of said frame, said frame being hollow and having rods passing through the side members thereof, springs in said hollow frame behind said rods, a flexible bumper member retained by said rods, a second frame attached to the first and having hollow side members, rods passing therethrough, springs therein, a rigid bumper member retained by said last-named rods, members pivotally mounted on opposite sides of said first-named frame and springs normally holding said members inward toward each other, posts mounted pivotally in said first-named frame rearward of said last-named members and having springs to normally hold the same in vertical position, a screen pivotally suspended from the tops of said posts, and means for normally holding said posts vertical and means for normally holding said first-named members vertical.

2. A device of the class described comprising a frame having a net suspended therefrom, means thereon adapted to be operated by the weight of a person to be forced back against the radiator of the vehicle, and means operable thereby and by impact to clasp about said person to prevent his escape therefrom, said means consisting of a pair of oppositely disposed resilient, pivoted rods, means for releasably securing said rods to said first-named means, means for preventing the forceful lifting of said rods after they have been released comprising ratchet teeth on said frame and a spring pawl on each of said rods, a second frame under said first-named frame and having hollow sides, rods resiliently slidable in said sides and having serrated surfaces, a forked support attached to the upper frame, a member pivotally mounted in said support and having a pointed end normally in engagement with said serrated surface, spring means tending to preserve said engagement, a slotted member extending from said rod, the upper end of said pivotally mounted member having releasable engagement with said slotted member.

Signed at New York city, in the county of New York and State of New York, this 22nd day of November, A. D. 1919.

ANTONINO DI LORENZO.